US008243072B2

(12) United States Patent
Kramer

(10) Patent No.: US 8,243,072 B2
(45) Date of Patent: Aug. 14, 2012

(54) METHOD FOR RENDERING AN OBJECT

(76) Inventor: Philip Kramer, Stockholm (SE)

(*) Notice: Subject to any disclaimer, the term of this patent is extended or adjusted under 35 U.S.C. 154(b) by 960 days.

(21) Appl. No.: 12/208,302

(22) Filed: Sep. 10, 2008

(65) Prior Publication Data

US 2009/0066691 A1    Mar. 12, 2009

Related U.S. Application Data

(60) Provisional application No. 60/971,276, filed on Sep. 11, 2007.

(51) Int. Cl.
G06T 15/50 (2011.01)
G06T 11/20 (2006.01)
G06T 11/00 (2006.01)
G09G 5/00 (2006.01)

(52) U.S. Cl. ......... 345/426; 345/441; 345/468; 345/581

(58) Field of Classification Search .................. 345/426, 345/441, 468, 581
See application file for complete search history.

(56) References Cited

U.S. PATENT DOCUMENTS

| 5,988,862 A * | 11/1999 | Kacyra et al. ..................... 703/6 |
| 6,198,431 B1 * | 3/2001 | Gibson ..................... 342/357.57 |
| 6,236,403 B1 * | 5/2001 | Chaki et al. .................. 345/420 |
| 6,628,279 B1 * | 9/2003 | Schell et al. .................. 345/420 |
| 6,784,882 B1 * | 8/2004 | Sugiyama ..................... 345/419 |
| 6,867,787 B1 * | 3/2005 | Shimizu et al. ............... 345/629 |
| 2002/0105515 A1 * | 8/2002 | Mochizuki ..................... 345/419 |
| 2004/0186604 A1 * | 9/2004 | Onodera et al. ................. 700/97 |
| 2007/0257909 A1 * | 11/2007 | Kihslinger ..................... 345/420 |
| 2008/0129753 A1 * | 6/2008 | Leung et al. .................. 345/629 |

* cited by examiner

Primary Examiner — David T Welch
(74) Attorney, Agent, or Firm — Fasth Law Offices; Rolf Fasth

(57) ABSTRACT

The method is for rendering an object. An object to be rendered is identified. An outline of the object is defined. A front plate of the object is identified. A back plate that is shifted relative to the front plate is created. A beveled side extending between the front plate and the back plate is identified. A beveled contour of the beveled side from a series of segments of edges is created. A boundary line between visible and non-visible segments of surfaces is identified.

17 Claims, 15 Drawing Sheets

FIG 1
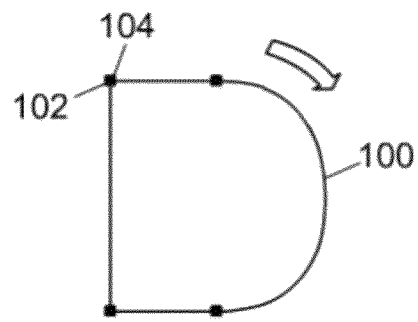
FIG 2
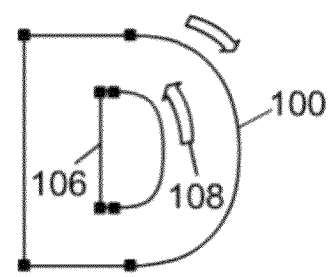
FIG 3
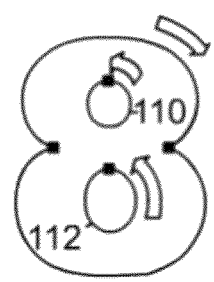
FIG 4
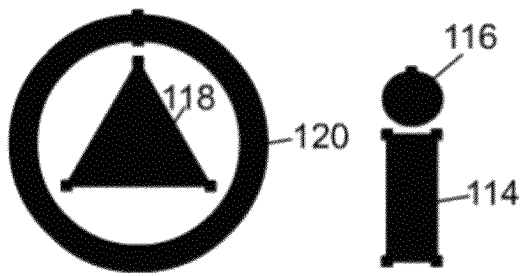
FIG 5
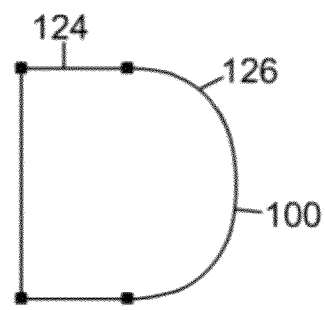
FIG 6
x=15, y=26 ■———■ x=25, y=26
          124

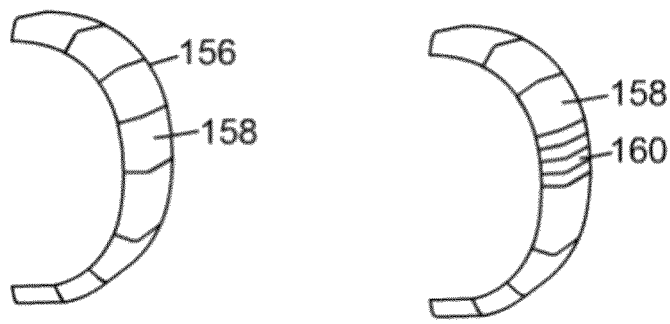
FIG 16
 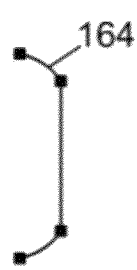 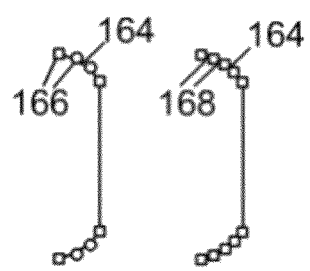
FIG 17A   FIG 17B   FIG 18
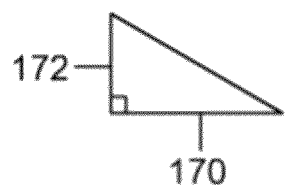 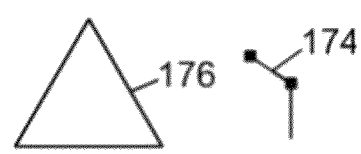
FIG 19   FIG 20

METHOD FOR RENDERING AN OBJECT

PRIOR APPLICATION

This patent application claims priority from U.S. provisional patent application No. 60/971,276, filed 11 Sep. 2007.

TECHNICAL FIELD

The method relates to a method for rendering an object such as a three dimensional object.

BACKGROUND OF INVENTION

The conversion of two-dimensional outlines to three-dimensional objects, as well as the animating of three-dimensional objects has been done before. However, the currently available methods are very cumbersome to use and may result in undesirable response times, as well as require large amounts of data since the three-dimensional objects usually must be broken down into small triangular units. As a result, the rendered objects are very slow to download and ill-suited for the Internet.

Many applications derive their three-dimensional models from a two-dimensional outline, however much of the outline data, such as the control points of curved edges, is often discarded as models are sculpted using a mesh consisting of small triangular or rectangular units. Very often the final animation will have curved edges, but since much of the original outline data was lost during the modeling process, these curves are often approximated based on the shape of the mesh, not the contours of the original two-dimensional outline. Since there is a direct relationship between the quality of the final image and the density of the mesh, rendering times increase exponentially with the desired output quality. If one considers the fact that the application must look at each unit of the mesh to determine the visibility of the object, it is easy to appreciate how rendering times can become quite long. As a result it is difficult for most applications using standard techniques to preserve the true contours of an object. It's also difficult for these applications to display outlines around the object. Often the latter is done using post-processing techniques. As a result, there is a need for a method that enables the convenient and effective rendering of three-dimensional objects suitable for the Internet, where the rendering is so efficient that it may even be done online or on mobile communication devices without requiring long response time, large file size and large memory capacity.

SUMMARY OF INVENTION

The method of the present invention provides a solution to the above-outlined problems. More particularly, the present invention makes it possible for an application to generate animation consisting of high-quality vector-based three-dimensional images containing a minimum number of shapes with a minimum number of straight and/or curved edges where processing times are linear based only on the complexity of the underlying three-dimensional object(s), and not exponential based on a quality setting requiring a mesh with an appropriate number of units to support the required quality requirements. The resulting application using this solution allows the user to take two-dimensional drawings, convert them into virtual three-dimensional objects, and create animation by combining these objects with a series of viewing angles taken from a virtual camera.

The application then converts each viewing angle into a frame where the visible portions of the virtual objects are displayed as two-dimensional shapes. These shapes can be output in various formats.

Unlike most traditional three-dimensional modeling applications, the present invention does not attempt to reproduce photorealism. Rather, it produces images that have a cartoon-like look and feel. The basic objectives of the application are that it should be intuitive and easy to use, and that the resulting animations should be small enough for the Internet.

The application should also be small enough to be used online or on mobile devices. This has led to a set of requirements affecting such things as response time, file size, memory usage, and flexibility regarding the various output formats such as Adobe Flash or Microsoft Windows.

BRIEF DESCRIPTION OF DRAWINGS

FIG. 1 is a schematic view of a single polygon,
FIG. 2 is a schematic view of a single polygon with cutout,
FIG. 3 is a schematic view of a single polygon with two cutouts,
FIG. 4 is a schematic view of model outlines according to the present invention,
FIG. 5 is a schematic view of a single polygon with straight and curved edges,
FIG. 6 is a schematic view of a straight edge,
FIG. 16 is a schematic view of a curved surface subdivision,
FIGS. 17a and 17b are schematic views of edge sets,
FIG. 18 is a schematic view of a curved edge segment conversion,
FIG. 19 is a view of right triangle,
FIG. 20 is a schematic view of a model data.

DETAILED DESCRIPTION

Figure 7:
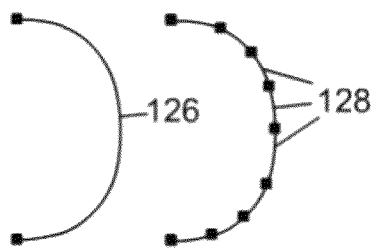
FIG. 7 is a schematic view of a curved edge.

With reference to the figures, a model may consist of a set of surfaces. The three dimensional coordinates may be indexed by integer values that define the model surfaces. A series of camera positions may be used as input for generating the two-dimensional images that make up the final animation. Each point of each surface is projected onto the two-dimensional image using the view point and focal point of the virtual camera. A cache is provided such that three-dimensional coordinates are guaranteed to only be translated once. Subsequent attempts to translate the same coordinate are retrieved from the cache.

A virtual tracing pen may be used to process the sides of a model. As the shapes that make up the two-dimensional image are generated, the projected two-dimensional coordinates are stored in a platform-specific module responsible for the actual rendering of the image. The two-dimensional coordinates are delineated by the number of points for each shape and a starting offset into the list of points. Additional information is provided to specify the number of polygons or closed polyline structures that a single shape contains. Whereas the formal definition of a polygon does not include curved edges, for the purposes of this patent the term polygon will be used for both polygons and closed polyline structures consisting of straight and/or curved edges.

In general terms, a rendered two-dimensional shape is made up of one or more polygons, where a polygon 100, as best shown in FIG. 1, is a series of directed edges. These edges are either straight or curved, and are processed by an application in a specific order, giving them a clock-wise or counter clock-wise direction. The polygon may be formed when the leading endpoint 102 of the last edge is equal to the trailing endpoint of the first edge 104. The starting edge may be arbitrary.

As best shown in FIG. 2, the enclosed area of the polygon forms a shape, and a cutout 106 into the shape is created if a subsequent polygon lies within this area. In such cases, the direction 108 of the subsequent polygon is reversed. As shown in FIG. 3, a shape 110 can have multiple cutouts 112 depending on the number of subsequent polygons.

Any number of shapes may be grouped together, and the position of one shape 114 may either be along side a neighboring shape 116 or inside the cutout 118 of another shape 120, as shown in FIG. 4. A three-dimensional application of the present invention may refer to a logical grouping of shapes as the model outline. The three-dimensional application is an application that takes as its initial input one or more model outlines created on the x, y-plane. These outlines are used to create the virtual objects rendered by the application. Each model outline may be created from a set of shapes made from a set of polygons. Each polygon may be created from a set of edges. The edges of a polygon are either straight 124 or curved 126, as shown in FIG. 5. The straight edge 124 may be defined by two x, y-coordinates, as shown in FIG. 6. The curved edge 126 may be subdivided into one or more curve segments 128, as shown in FIG. 7.

Figure 8:
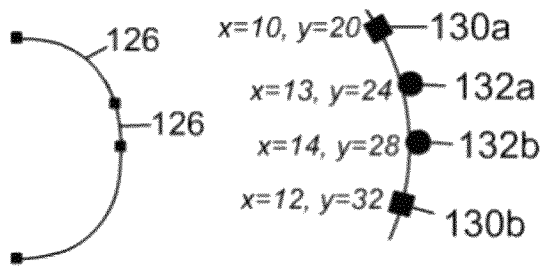
FIG. 8 is a schematic view of a curve segment.

As shown in FIG. 8, a curve segment 128 may be defined by four x, y-coordinates that make up a cubic Bezier-curve. A cubic Bezier-curve may have two anchor points 130a, 130b and two control points 132a, 132b.

Figure 9:
FIG. 9 is a schematic view of a curve to straight edge conversion.

As shown in FIG. 9, various features of three-dimensional application require that curve segments be converted into a series of straight edges 134. In this conversion process, the anchor and control points of the cubic Bezier-curve are used as input.

Figure 10:
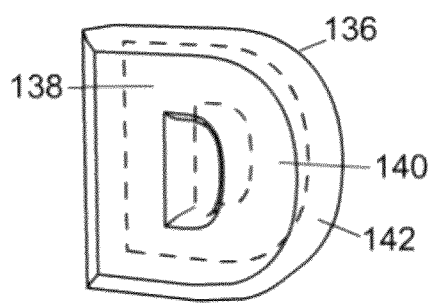
FIG. 10 is a three-dimensional model according to the present invention.

As shown in FIG. 10, a basic model 136 created by the three-dimensional application of the present invention may be made up of a front plate 138, a back plate 140, and one or more sides 142. This basic model is often used as a primitive to form more complex models as will be described later. This primitive is referred to as a model part.

Figure 11:
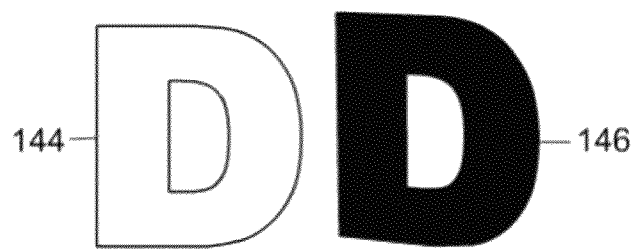
FIG. 11 is a perspective view of a front plate constructed from three dimensional polygons.
Figure 12:
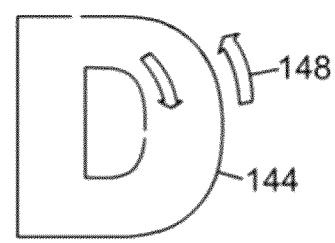
FIG. 12 is a schematic view of a back plate.

A surface may be defined as a set of three-dimensional coordinates. The front plate is created from the entire edge set that defines the outline 144. A set of three-dimensional coordinates are created by adding a third component to each two-dimensional coordinate of each edge in the edge set. The result is one or more three-dimensional polygons 146, as shown in FIG. 11. As described earlier, the edges of a polygon have a specific clock-wise or counter clock-wise direction, and when created, the front plate inherits the direction of the original polygon. The back plate is created in a similar manner but with the direction of the resulting three-dimensional polygon(s) being reversed, as shown by an arrow 148 in FIG. 12.

Figure 15:
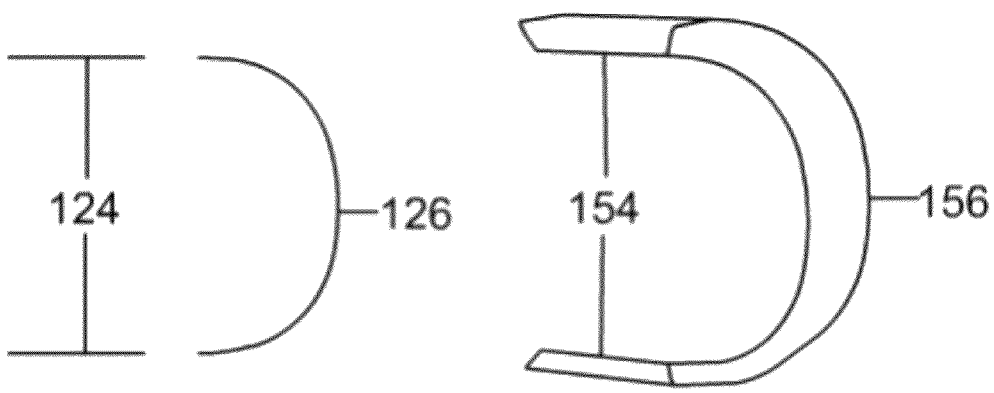
FIG. 15 is a schematic view of straight and curved surfaces

In addition to its front and back plate surfaces, a model can also have one or more surfaces that form the sides 150. The surfaces forming the sides of a model part are either straight 154 or curved 156 and are created from a single edge of the edge set as shown in FIG. 15. A straight surface 154 is created from a straight edge 124 and a curved surface 156 is created from a curved edge 126.

Figure 13:
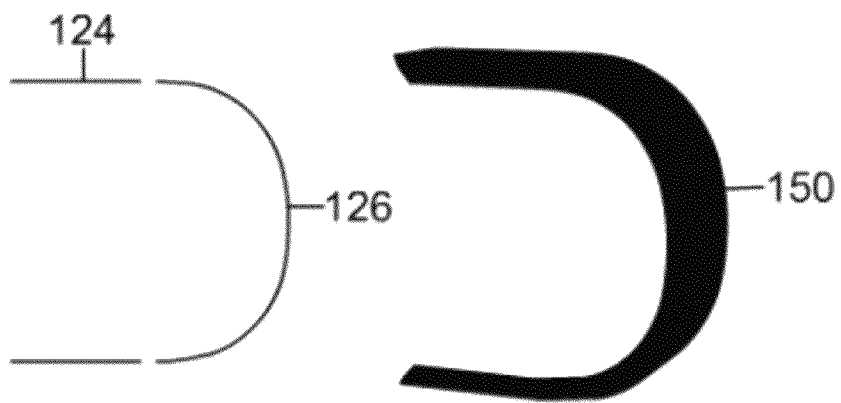
FIG. 13 is a schematic view of a single side surface.
Figure 14:
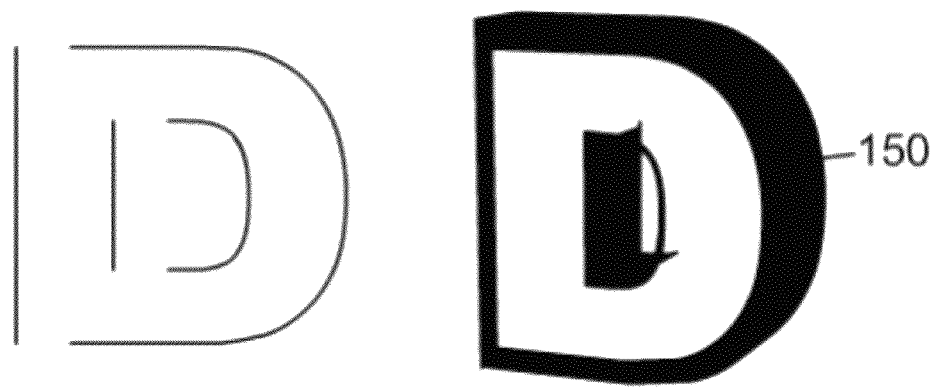
FIG. 14 is a schematic view of side surfaces.

If a single curved surface is desired as in FIG. 13, then the input edges must be altered such that the two straight edges become the leading and trailing curve segments of the curved edge, but with the appearance of straight edges as shown in FIG. 14.

As with curved edges, the curved surface 156 may be subdivided into segments 158 that are further subdivided into units corresponding to the series of straight edges extracted from a curve segment, as shown in FIG. 16. This extraction is done using the curve to straight edge 160 conversion process referred to earlier.

The sides of a model can be beveled. This bevel is created by scaling and repositioning the model outline. A flat bevel is created by scaling and repositioning the model outline only once, whereas for a rounded bevel the model outline must be scaled and repositioned a number of times to create the desired curved contour. The bevel may be defined by a set of straight 162 and/or curved edges 164 that make up the bevel edge set. This edge set may be created on the z, y plane and connects the front and back plate surfaces of the model part, as shown in FIGS. 17a-17b.

Although the bevel edge set may include curved edges 166 including anchor and control points, the beveled contour is created from a series of straight edges. Curve segments of a curved edge must therefore be subdivided into straight edges using the curve to straight edge 168 conversion process referred to earlier, as shown in FIG. 18. The series of straight edges extracted from the bevel edge set may be used to create the bevel. As mentioned earlier, the bevel is created by scaling and repositioning the model outline, and to do this, a right triangle of each edge in the series is needed.

A right triangle is defined as a set of three edges, where two of the three edges form a 90 degree angle. These two edges are positioned on the x and y axis respectively. The horizontal edge is referred to as the adjacent edge 170 and the vertical edge is referred to as the opposite edge 172, as shown in FIG. 19. These adjacent and opposite edges are used in the following procedures. A flat bevel 174 is created from a bevel edge set containing a single straight edge. For such a bevel, the model outline 176 is only scaled and repositioned once. In the simplest case, the model outline may also consist of only straight edges, as shown in FIG. 20.

Figure 21:
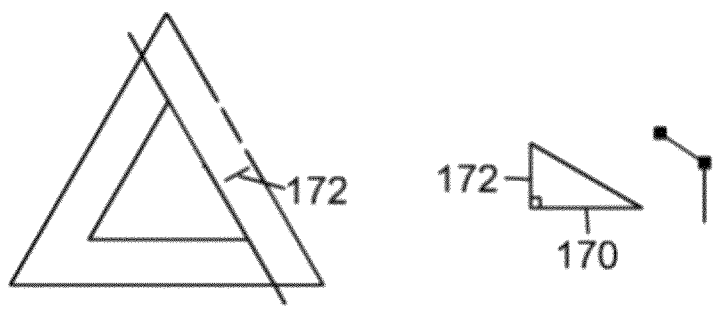
FIG. 21 is a schematic view of a scaled outline.
Figure 22:
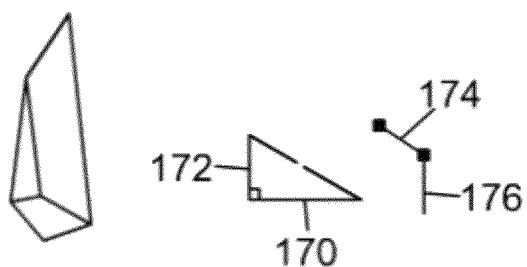
FIG. 22 is a schematic view of a repositioned outline.

Each edge may be duplicated and moved such that it lies parallel to the original edge. The distance that the edge is moved is equal to the length of the opposite edge 172 of the right triangle formed from the edge of the bevel edge set. The set of points created by the intersection of these new edges form the scaled outline, as shown in FIG. 21. The scaled outline can now be repositioned by moving it along the z axis. The distance that the outline is moved is equal to the length of the adjacent edge 170 of the right triangle, as shown in FIG. 22.

Figure 23:
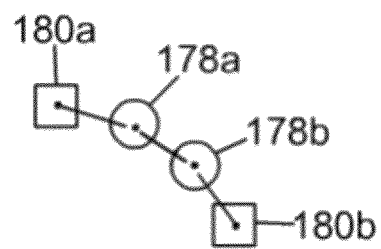
FIG. 23 is a schematic view of edges.

To scale an outline that contains curved edges, rather than duplicating and moving the curved edges, the control points of these edges are used to create additional straight edges. These edges are formed by connecting the two control points 178a and 178b and the two endpoints 180a and 180b. The first edge connects the first endpoint 178a with the first control point 180a, the second edge connects the two control points 178a, 178b, and the third edge connects the second control point 180b with the second endpoint 178b, as shown in FIG. 23.

Figure 24:
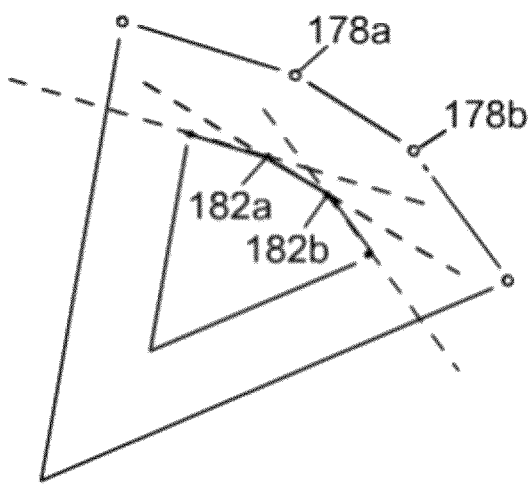
FIG. 24 is a schematic view of scaled control points.

These edges are then duplicated and moved as described previously resulting in a scaled outline with correctly scaled control points 182a, 182b, as shown in FIG. 24.

Figure 25:
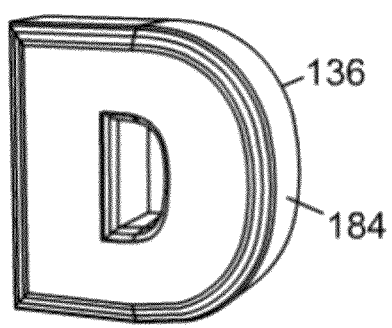
FIG. 25 is a schematic view of a model part with bands.

If the bevel edge set contains one or more curved edges or segments of a curved edge, the number of edges in the resulting series of straight edges that are extracted from the bevel edge set determines how many times the model outline is scaled and repositioned. This can be thought of as creating slices along the z-axis. These slices form a set of divisions that are needed for rendering the model. These divisions are referred to as bands 184, and are used to identify a subdivision of each surface, as shown in FIG. 25.

Figure 26:
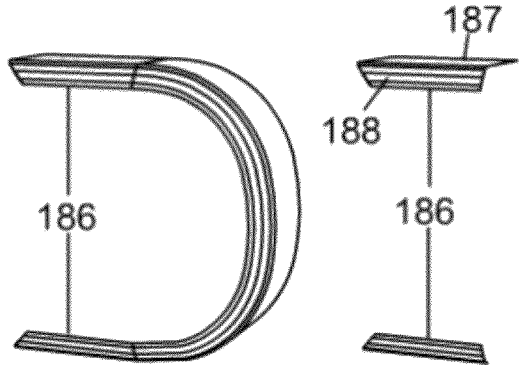
FIG. 26 is a schematic view of surface units.
Figure 27:
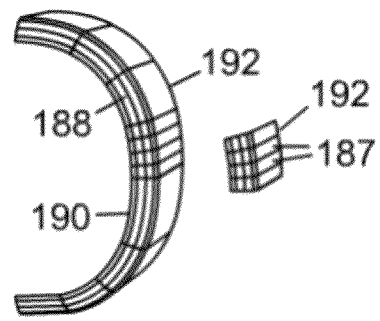
FIG. 27 is a schematic view of expanded segments.

The surfaces forming the sides of a model are made up of four-sided surface units 187. For a straight surface 186, the band 188 is enough to identify the surface unit, and a straight surface will have as many surface units as there are bands, as shown in FIG. 26. In order to identify the surface units of a curved surface 190, the band 188 is needed in addition to the segment number 194 of the curved surface, and the unit number of the segment since the surface is divided into segments and each segment is expanded into smaller units, as best shown in FIG. 27.

Figure 28:
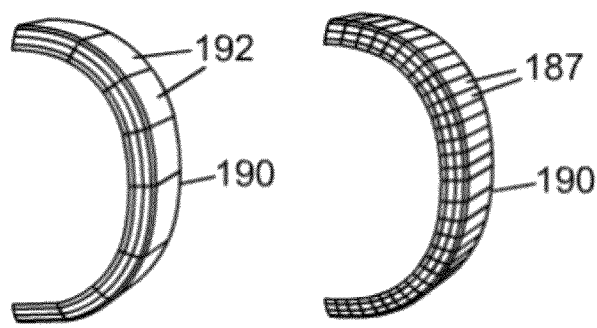
FIG. 28 is a schematic view of divisions of curved surface.
Figure 29:
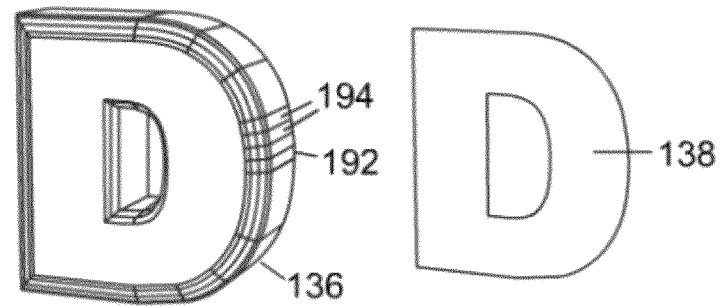
FIG. 29 is a schematic view of four-sided surface units and a multi-sided surface unit.

The surface unit of a curved surface is therefore identified by the band, segment, and segment unit numbers, and this curved surface will have as many surface units as there are bands multiplied by the number of segments multiplied by the number of segment units, as shown in FIG. 28. Whereas the surfaces forming the sides of a model are made up of four-sided surface units, the front and back plate surfaces of a model are single multi-sided surface units, as shown in FIG. 29.

Figure 30A:
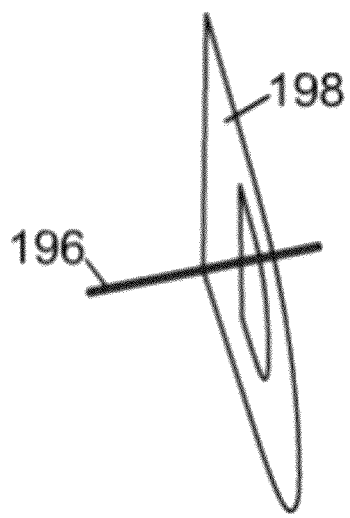
FIGS. 30a and 30b are schematic views of a perpendicular line extending through the surface unit.
Figure 30B:
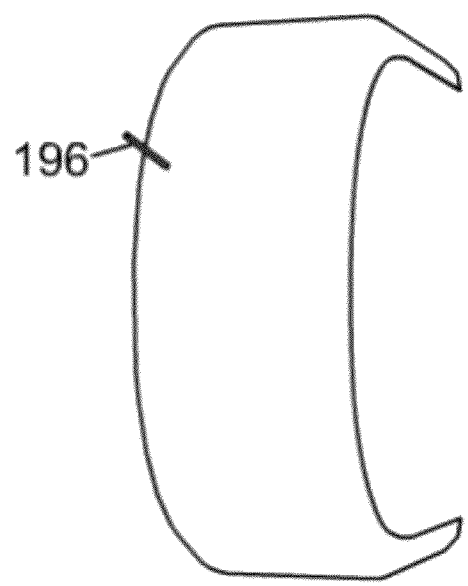
Figure 33:
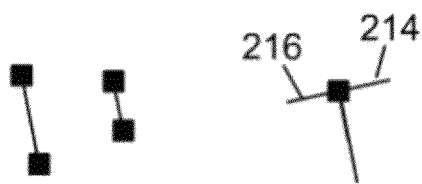
FIG. 33 is a schematic view of an axis of rotation.
Figure 34:
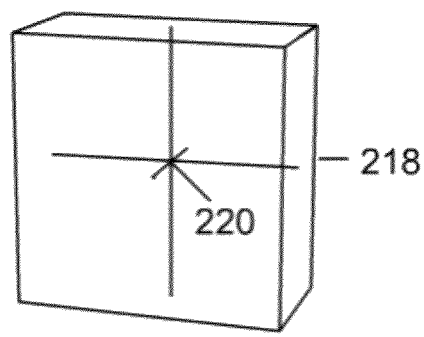
FIG. 34 is a schematic view of a midpoint of a cubic region.

Each surface unit in a model has both a front and a back face, and is only considered visible if the front face can be seen by the virtual camera. The back face of a surface unit can therefore never be seen. Surface visibility is determined by creating a straight line 196 perpendicular to the plane 198 of each surface unit, and positioned such that each endpoint lies equidistant to the plane of the surface unit, as shown in FIGS. 30a and 30b. By comparing the distances from each endpoint to the camera, the surface unit is determined visible if the endpoint on the front face is closer to the camera than the endpoint on the back face. Since the surface unit 200 of a front or back plate surface was created on the x, y-plane, the perpendicular line is created on the z, y-plane with an arbitrary length. For the sides, the perpendicular line of each surface unit is made from the edge extracted from the curve segments of the bevel edge set 202 used to create the band that the surface unit lies on, and the edge of the outline 204 that the unit was created from, as shown in FIGS. 33 and 34. These edge sets may be referred to as the bevel edge and the outline edge sets respectively.

Figure 31:
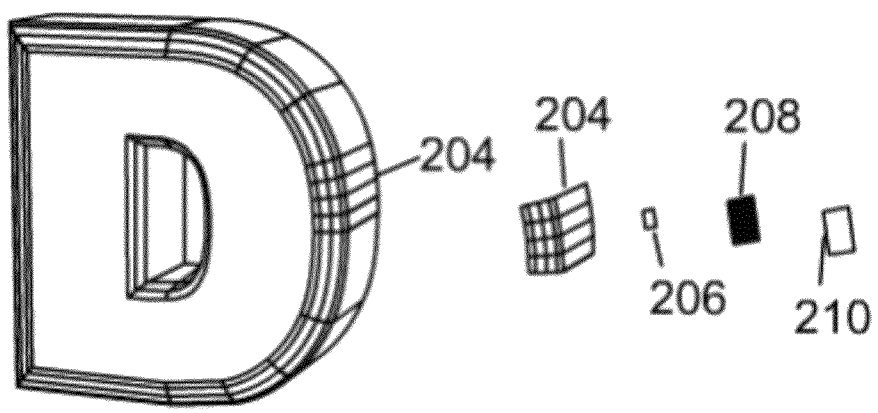
FIG. 31 is a schematic view of an edge of a surface unit.
Figure 32:
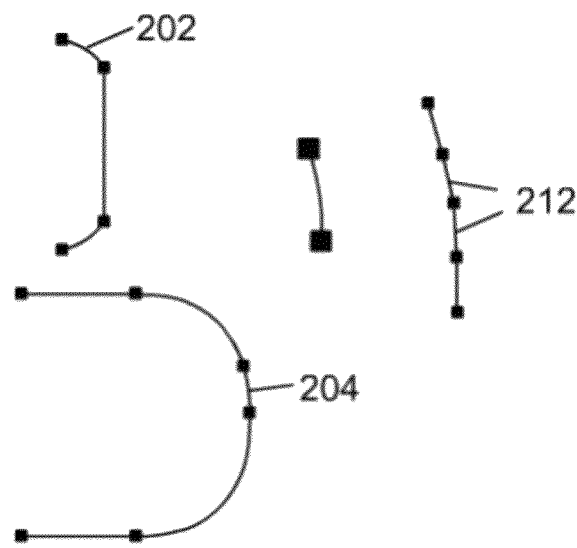
FIG. 32 is a schematic view of an extracted straight edge.

FIGS. 31 and 32 identify the entities used to create the line that runs perpendicular to the plane of a surface unit. FIG. 31 highlights the edge of a surface unit by first identifying a group of surface units 204, then (moving left to right) isolating the surface units and extracting an individual unit 206, enlarging it 208 and emphasizing the target edge 210. FIG. 32 highlights the straight edges 212 extracted from the curve segments of both the model outline edge set and the bevel edge set. The line running perpendicular to the plane of a surface unit of a curved surface with a rounded bevel is created from the straight edges extracted from the curve segments of both the bevel edge set and the model outline edge set. A new line is created from the outline edge on the x and y planes. One of its endpoints is then adjusted so that its length is equal to the length of the bevel edge.

This line is then duplicated, and the two lines 214, 216 are placed perpendicular to the outline edge by rotating one endpoint of the first line 90 degrees and one endpoint of the second line 270 degrees, resulting in a single line whose midpoint is the endpoint of the outline edge, as shown in FIG. 33. This midpoint now serves as the axis of rotation, which is then used to rotate the line in three-dimensions such that it lies perpendicular to the plane of the surface unit. The angle of rotation is the angle of the bevel edge relative to the x-axis where the bevel edge set was defined.

As was stated previously, a shape is the enclosed area formed by a set of one or more polygons. Three-dimensional models may be created from the two-dimensional values that define these shapes. These shapes may be referred to as input shapes. The three-dimensional model is constructed by adding a third z-component to the two-dimensional values of the input shapes, resulting in surfaces that are defined by a set of three-dimensional coordinates. To render a three-dimensional image, the three-dimensional coordinates should be transformed back into two-dimensional coordinates. These two-dimensional coordinates form a set of output shapes that are displayed in a frame, and these output shape(s) correspond to the visible portion of a surface.

A frame contains any number of output shapes that must be sorted in order to be displayed correctly. To do this the distance between the virtual camera and the three-dimensional coordinates of the surface that the output shape is derived from is used. Since the output shapes in a frame may belong to different model parts, a nested sorting procedure is performed that first establishes the order in which to process the model parts. It then establishes the order in which to display the shapes of the model part. At this stage, the three-dimensional application does not distinguish between an independent model and a set of model parts that form a model.

Model parts are sorted based on their distance from the virtual camera. The distance of a model part is determined from the distance between the camera and a single three-dimensional coordinate within the cubic region that bounds the model part, as shown in FIG. 34. This cubic region 218 is defined by the bounding rectangle of the outline that defines the model part, and the distance between the front and back plates. The mid point 220 within the region will as a default be the center of the region, but may be altered as described later.

Three-dimensional models often consist of single model parts, but more complex three-dimensional models may be created by grouping a set of parts together. A three-dimensional model is therefore defined as a set of one or more model parts. When grouping model parts, one part is considered to be the root, and the remaining parts are considered to be dependent on the root. A root model part may have any number of dependent parts attached to it, and the parts attached to the root may themselves have parts attached to them.

Parts are attached when they touch or are close to one another, and they may be attached using a virtual pin. A pin may be defined by two three-dimensional coordinates, making up its endpoints. The pin belongs to the model part that is to be attached to the neighboring model part, and will be pinned at one end into a surface of the neighboring part, and pinned at the other end into one of its own surfaces. The endpoint pinned into its own surface is positioned as a default at the center of the model part. This endpoint may also be used to define the distance of the model part from the virtual camera.

The sorted list of model parts may contain three types of parts; independent parts, dependent parts, and root parts. If an independent part is retrieved from the list it is simply processed by generating and sorting the set of shapes that belong to the part. If a dependent part is retrieved from the list the endpoints of its virtual pin must be used to determine if it or its neighboring part is farther from the virtual camera. If the part retrieved is farther, then it is processed; otherwise this step is repeated recursively using the neighboring part as the current part.

This recursive step includes checking to see if the current part has a virtual pin, and if so, whether it or its neighboring part is farther from the virtual camera. If either of these conditions is not true the next step is to process the part and return to the prior point and continue by processing the current part.

If a part is a root, it has either been processed as a result of being attached to a dependent part, or it may be processed during the final step as follows:

Since a root part will only be processed if it is farther away from a dependent part attached to it, and not processed otherwise, we must indicate while we go through the list whether a part has been processed so that as a last step of this process we can check the list for any remaining parts that have not yet been processed and then process the root part.

Objects may be grouped in a hierarchical manner such that the procedure described can be nested any number of times for each set of objects in the hierarchy, and virtual pins would be applied to each set of objects as though they were single objects.

An output shape is the visible portion of a surface, where the three-dimensional values of the surface have been transformed into a set of two-dimensional values. For the output shapes to be displayed correctly, the distance between the three-dimensional surface and the virtual camera has to be taken into consideration. This is done by having the output shape inherit two values from the surface. These values are the distance between the camera and the three-dimensional coordinates that are farthest away and closest. The average of the two distance values is often used to determine how the output shape is to be sorted. Alternatively, a priority may be assigned to the surface.

In some situations a given type of surface should always be placed behind another type of surface, and in this situation the priority value is used instead of the distance. The priority value must therefore be checked first. A higher priority shape is displayed before a lower priority shape, but if both shapes have the same priority, then their distance values are used to determine the order.

Just as with input shapes, an output shape also has direction associated with it. But rather than being constructed from an edge set consisting of directed edges, the output shape is constructed from vectors, where a vector is defined by a single two-dimensional value. The direction of the shape is defined by the ordering of these vectors relative to an arbitrarily selected starting point. This starting point is the first two-dimensional value in the series.

Figure 35:
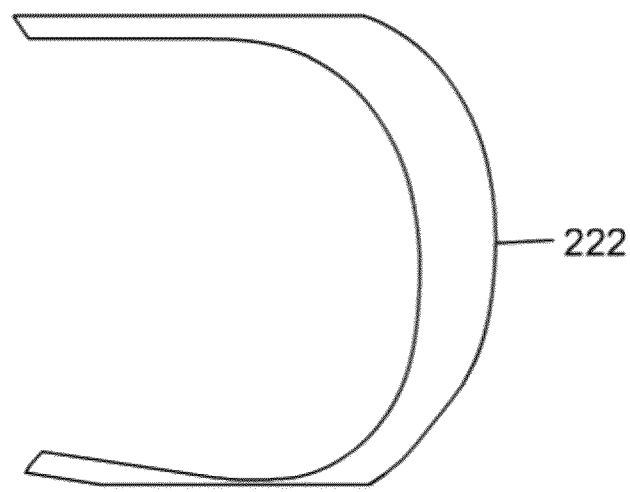
FIG. 35 is a schematic view of an output shape.

FIG. 35 shows an output shape with edges that have been clipped to fit within a specified rectangular region. In order to render these two-dimensional vectors efficiently, they may be maintained by the three-dimensional application in a platform-specific format. In order to reference these vectors in a platform-independent manner, an output shape is defined by two values; an offset value pointing at the first vector in the series, and the number of vectors that follow. Other platform-independent information such as color is also included with the shape definition.

The surfaces of a model part may be considered to be sliced vertically into bands, with curved sections divided further horizontally into segments and segment units. This decomposition of a surface may results in the set of four-sided surface units described earlier. The sides of a surface unit may be considered to have both a left and right vertical edge, and a top and bottom horizontal edge. The set of surface units together form a set of rows and columns, with adjacent units sharing a common edge. The set of surface units may be referred to as the surface unit grid.

Figure 36:
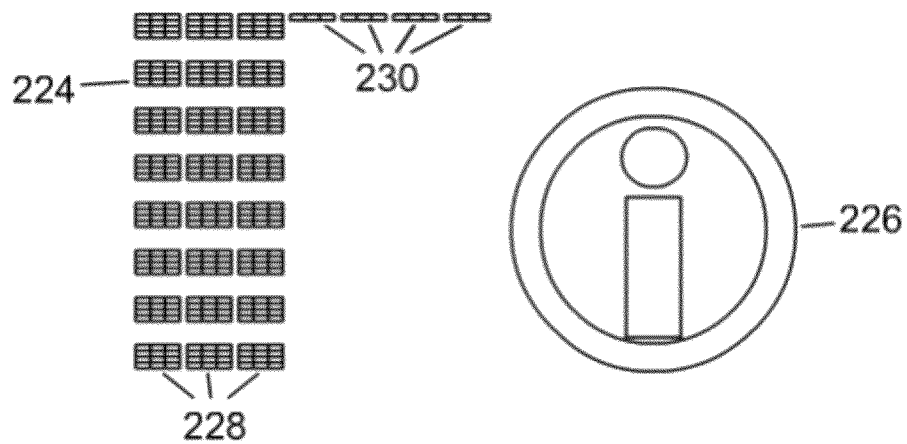
FIG. 36 is a schematic view of a surface unit grid.

FIG. 36 shows the surface unit grids 224 corresponding to the surfaces formed from a model outline 226. The model outline contains three curved edges 228 and four straight edges 230 resulting in seven surfaces and seven surface unit grids. Each of the curved edges has 3 bands and 8 segments, and each segment is further subdivided into 4 segment units resulting in a surface unit grid of 32 rows and 3 columns. Each of the surfaces derived from the straight edges consist of a single straight surface with three bands, and their surface unit grids therefore consist of 3 columns and a single row.

Figure 37:
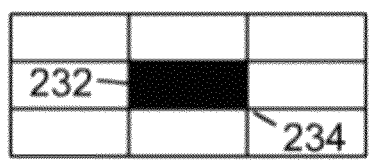
FIG. 37 is a schematic view of a left edge of a surface unit.

The vectors that make up a shape may be created by tracing the boundary formed from a set of visible surface units in the surface unit grid. This tracing may be done using a virtual pen. In order to trace the outline, a set of four bits are maintained for each surface unit. These bits correspond to the four sides of the unit. The tracing pen is initially placed on the left edge 232 of one of the surface units 234, as best shown in FIG. 37.

Figure 38:
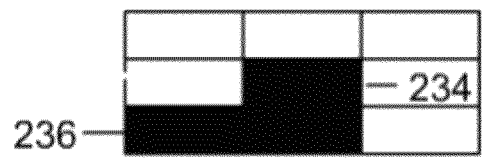
FIG. 38 is a schematic view of a tracing pen movement.

It will then either be moved along the edges of that unit in a counter clock-wise direction or be moved to a neighboring unit. There are three alternatives to determine the next position of the pen. It will either be moved straight, to its left, or to its right. If it is moved to its right it will remain on the same unit, but if it is moved straight or to its left it will be placed on an adjacent unit 236, as shown in FIG. 38.

The direction is determined by checking the bits of the edges that correspond to the three directions. If a bit is set to one the tracing pen is moved in that direction. If the bits are set correctly, the boundary forming the shape is guaranteed to be correct.

Figure 39:
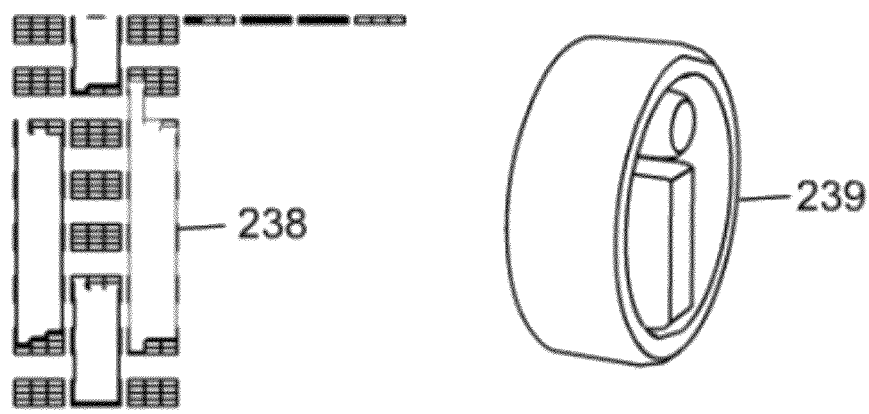
FIG. 39 is a schematic view of resulting shapes.
Figure 40:
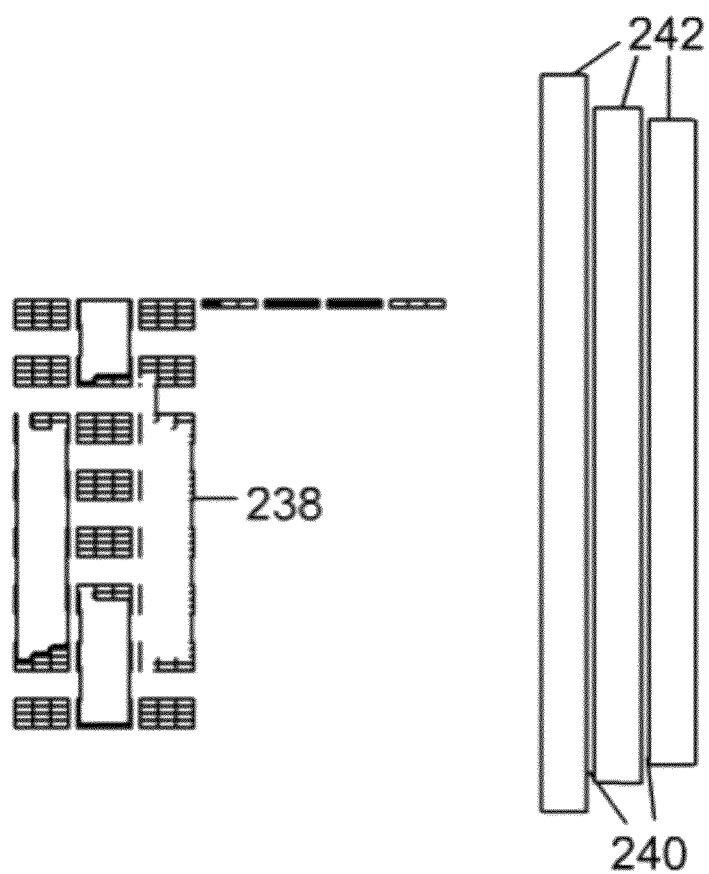
FIG. 40 is a schematic view of removing common edges.

FIG. 39 shows the resulting shapes 238 formed by tracing the boundary around adjacent visible surface units of a model 239. In order to set the bits correctly, two steps are required. Assuming that all bits are initially set to zero, the first step is to set the two bits corresponding to the left and right edges to one for each contiguous set of visible surface units on each band of the model part. In addition to setting the left and right bits for a contiguous set of units, the bits corresponding to the top edge of the first unit and the bottom edge of the last unit must also be set to one, as shown in FIG. 40.

Figure 41:
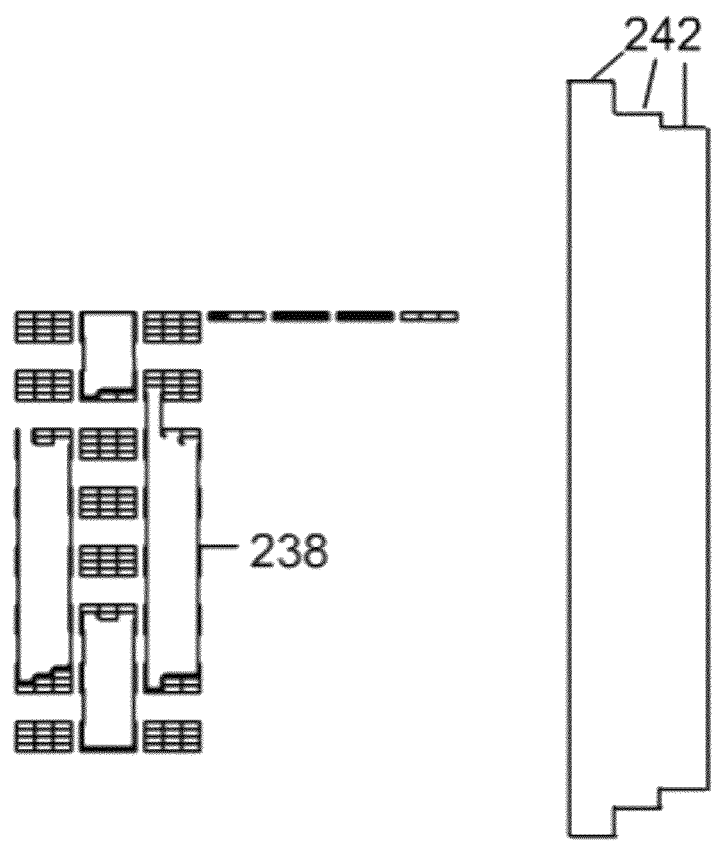
FIG. 41 is a schematic view of removing common edges.

The second step is to set the bits corresponding to the common edges 240 of visible units on neighboring bands 242 to zero. This second step is only necessary if there is more than one band, as shown in FIG. 41.

Often a curved surface forming the side of a model part must be subdivided so as to allow the final output shapes to be stacked and displayed properly. When such a curved surface is to be divided, the division can be made between any two surface units, and all that needs to be done is to set the bits corresponding to these edges to one. For example if the division is to be made along a segment boundary resulting in an upper and a lower segment, the bit corresponding to the top of the first unit of the lower segment as well as the bit corresponding to the bottom of the last unit of the upper segment are set to one. This may result in the tracing pen creating two separate shapes.

Figure 42:
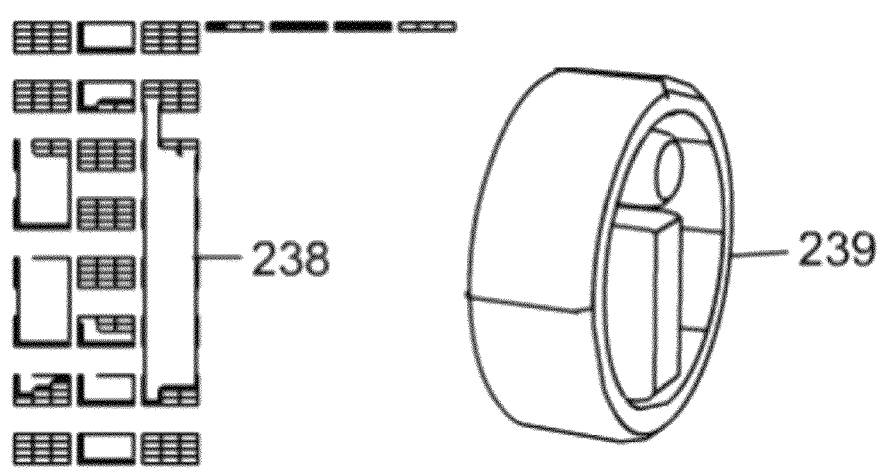
FIG. 42 is a schematic view of a dividing outer surface.

FIG. 42 shows the result of dividing the outer surface of the outer ring into four parts, and the inner surface of the outer ring into four parts. These edges forming the division between divided surface units will be transparent when rendered, if included as part of the final output shape.

A segment of a curved surface forming the side of a model part is considered to be exposed on one side if there are no visible surface units adjacent to it. At the same time that the bits corresponding to the sides of the surface units are being set, information describing the overall status of each segment of a curved section is also created.

Figure 43:
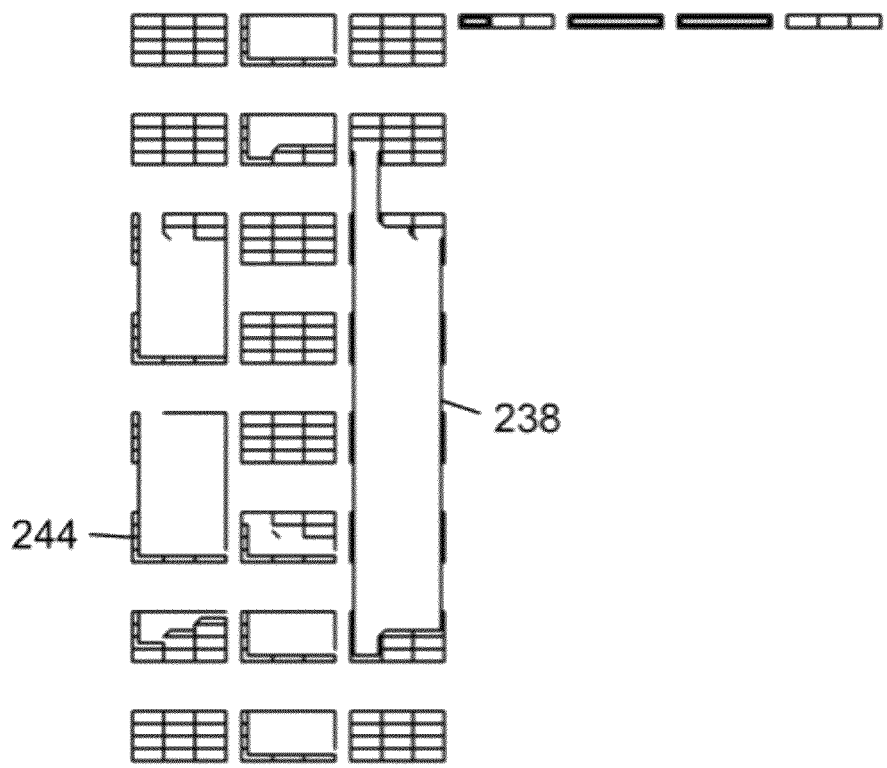
FIG. 43 is a schematic view of exposed segments.
Figure 44:
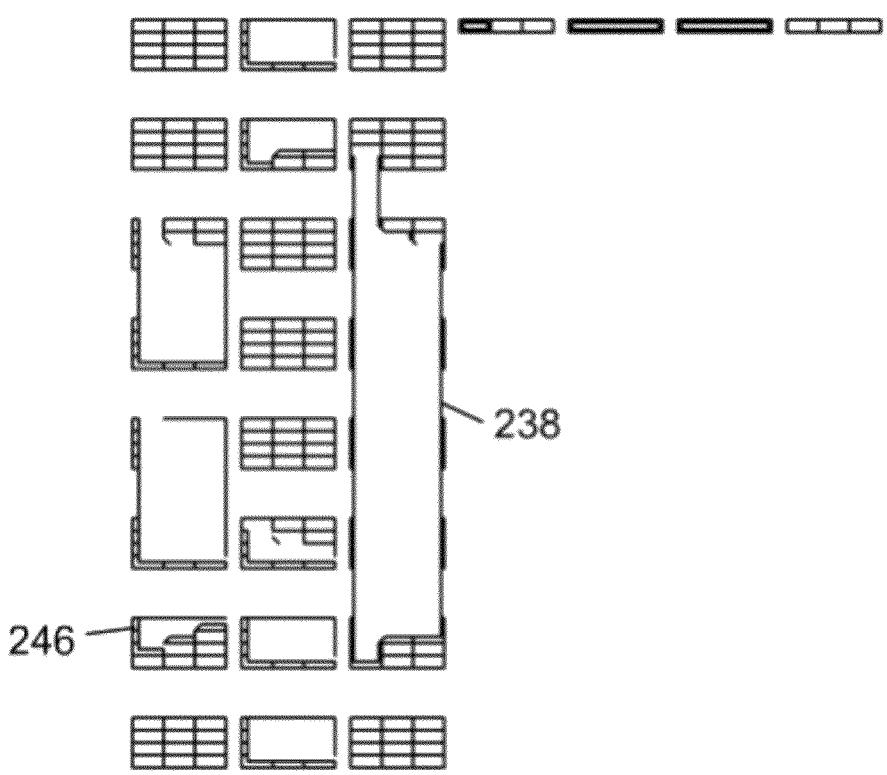
FIG. 44 is a schematic view of surface units on an exposed segment.
Figure 45:
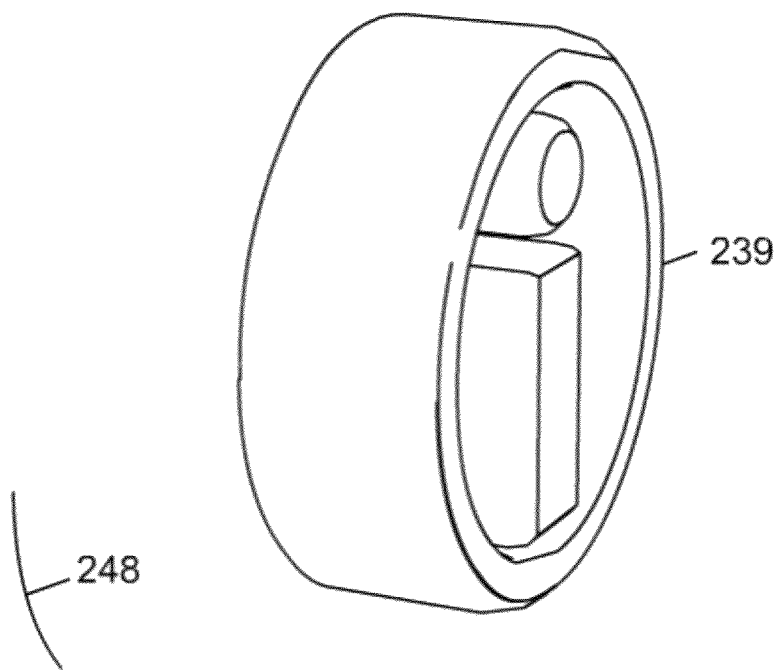
FIG. 45 is a schematic view of a curved vector.
Figure 46:
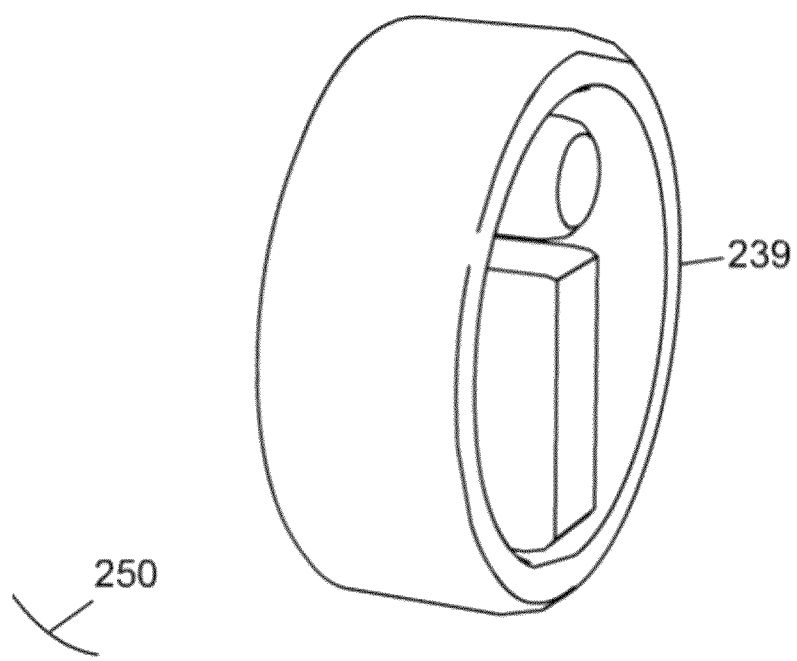
FIG. 46 is a schematic view of a partial curve.

This information includes whether an entire left or right side 244 of the segment is exposed, as shown in FIG. 43, or whether a subset 246 of surface unit edges of the segment are exposed on the left or right side, as shown in FIG. 44. For both of these situations, a single curved vector 248 may be drawn when rendering the final shape, as shown in FIG. 45. For the latter, the control point for a partial curve 250 should be calculated, as shown in FIG. 46. This may be done once the bits corresponding to the sides of each surface unit are set properly, and the information describing the overall status of the segment is created.

In order to create a partial curve, the original cubic Bezier-curve included in the surface definition and the endpoints that delineate the set of visible units of the segment are used. Vectors are created by following the path along the surface unit edges where the bit values were set to one. When the bits defining the visible edges of a surface unit are set, the first surface unit number for each contiguous set of units on a band are saved so that they can later be used as starting points of an iteration of the tracing procedure.

Figure 47:
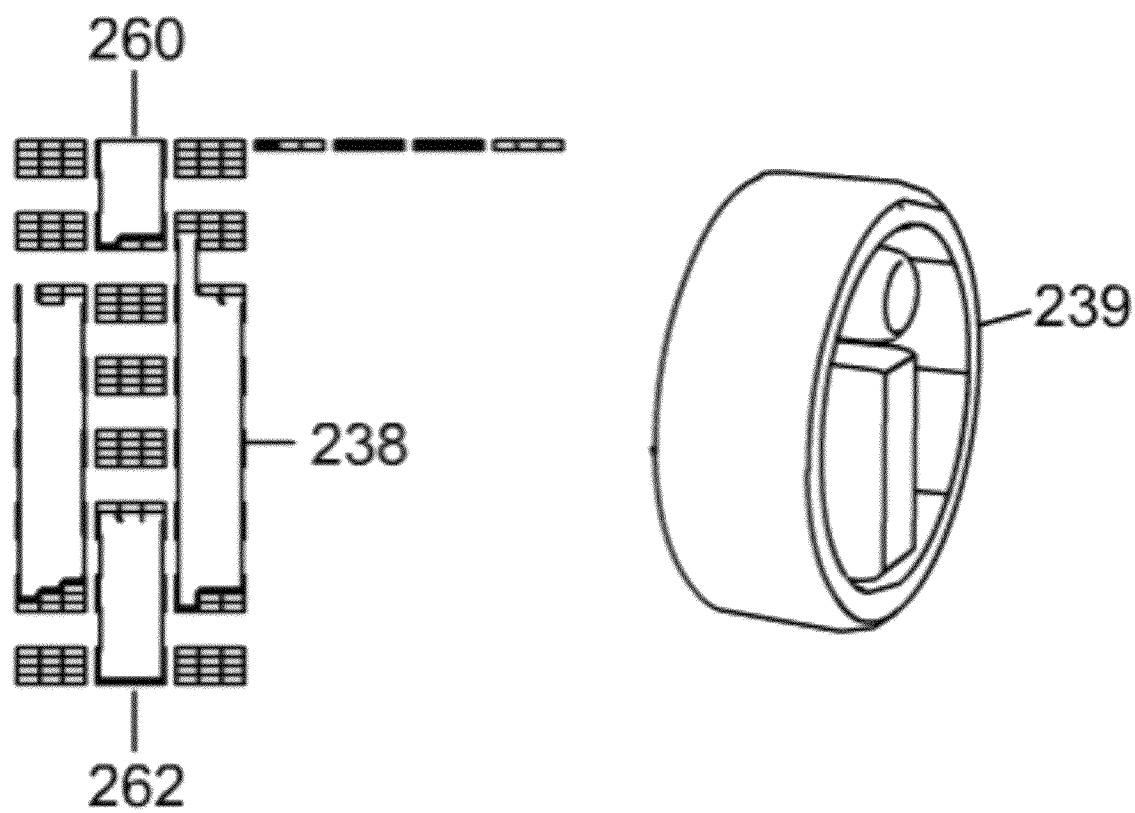
FIG. 47 is a schematic view of a surface that wraps around.

One or more output shapes may be created from a single surface and each additional shape derived from a surface requires a new iteration of the procedure. One or more starting points are set for each band, but a starting point is often removed when the corresponding unit is included in an iteration of the procedure. A model part whose sides consist of a single surface may wrap around such that the top of the first unit of the first segment 260 shares a common edge with the bottom of the last unit 262 of the last segment, as best shown in FIG. 47. These edges, if included as part of the final output shape, will be transparent when rendered.

In order to navigate the virtual camera, a set of positions in three-dimensional space are created forming a virtual sphere. These positions make up the set of camera angles that can be selected for a given frame. This spherical structure may further be subdivided into horizontal rings such that an angle is selected by specifying a ring, a position on the ring, and the radius of the ring. By specifying the ring the vertical angle of the selected camera position may be determined. This is the angle between the y-component of the camera position and the y-component of the center of the sphere. The horizontal angle of the camera position relative to the ring may then be determined. The horizontal and vertical angles, together with the radius of the ring, may then be used to calculate the final three-dimensional coordinate.

Figure 48:
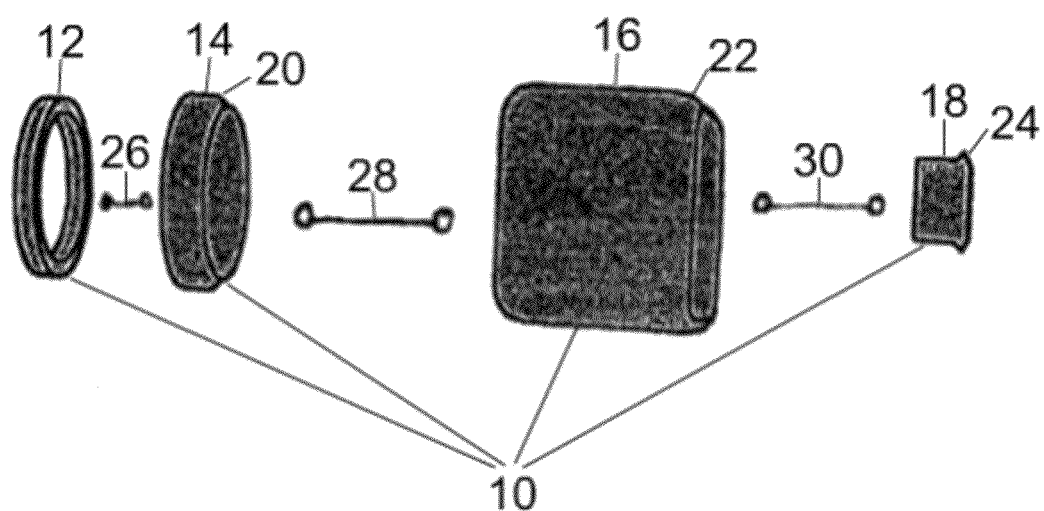
FIG. 48 is an exploded side view of camera components that are linked by virtual pins according to the method of the present invention.

With reference to FIG. 48, an object or model 10, such as a camera with four components, is shown as an illustrative example. The camera has a lens 12, a lens holder 14, a camera body 16 and a view port 18. The lens 14, the camera body 16 and the view port 18 have beveled surfaces 20, 22, 24, respectively. A first virtual pin 26 extends between the lens 12 and the lens holder 14. A second virtual pin 28 extends between the lens holder 14 and the camera body 16. A third virtual pin 30 extends between the camera body 16 and the view port 18.

Figure 49:
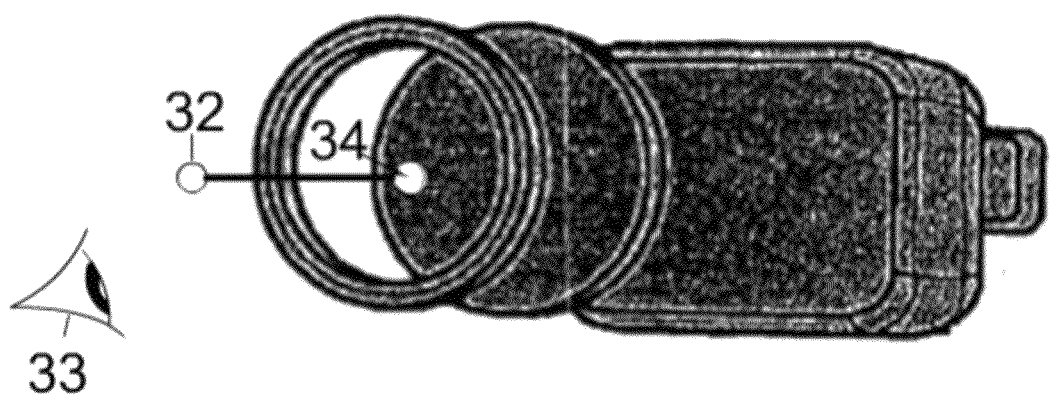
FIG. 49 is a perspective view of the camera components shown in FIG. 48

One function of the virtual pins 26, 28 and 30 is to ensure that the components 12, 14, 16 and 18 are drawn in the correct order since the virtual pins may be used to determine which components are farthest away so that the components may be drawn in the correct order. The positions of the virtual pins are not important as long as the direction of the virtual pins is perpendicular to the surfaces of the connecting components. As best shown in FIG. 49, the virtual pin 26, for example, has a first endpoint 32 and an opposite second endpoint 34. The virtual pin 26 is perpendicular to the surfaces of both the lens 12 and the lens holder 14. When the view of the camera 10 is illustrated in a perspective view the lens 12 partially overlaps the lens holder 14 because the lens 12 is closer to the viewer than the lens holder 14. To determine which part is the closest relative to a view point 33 of a viewer of the two components 12, 14, the endpoints 32, 34 may be used for a particular camera angle. Since the second endpoint 34 has an xyz-coordinate that is further away from the view point 33 of the viewer than the xyz-coordinates of the first endpoint 32, it may be determined that the lens holder 14 is further away compared to the lens 12. Because the lens holder 14 is further away than the lens 12, the lens holder 14 is drawn before the lens 12. Using this methodology of using the endpoints of the virtual pins, it may be determined that the view port 18 is the farthest away from the viewer and should therefore be drawn first of all the components. The complete camera body 16 is then drawn to partially overlap the view port 18. The complete lens holder 14 is then drawn to partially overlap the camera body 16. Finally, the complete lens 12 is drawn to partially overlap the lens holder 14.

While the present invention has been described in accordance with preferred compositions and embodiments, it is to be understood that certain substitutions and alterations may be made thereto without departing from the spirit and scope of the following claims.

The invention claimed is:

1. A method for rendering an object, comprising:
identifying a two-dimensional outline by using coordinates,
a rendering application creating a front plate of a first model part by using the outline, the rendering application creating a back plate being shifted relative to the front plate,
providing a virtual tracing pen and creating a beveled side extending between the front plate and the back plate by tracing coordinates in one of three directions of a grid formed by surface units and determining whether neighboring surface units are visible or not visible by using a virtual camera,
providing a virtual pin having a first end-point and a second end-point,
associating the first end-point of the virtual pin with the first model part and the second end-point of the virtual pin with a second model part, and
identifying a first distance between the first model part and the virtual camera, defining a relationship between the first model part and the second model part in order to determine when to compare the first distance with a second distance extending between the second model part and the virtual camera,
sorting the first model part and the second model part based on the virtual pin and the first distance and the second distance, and
rendering the first model part first when the first end-point of the virtual pin associated with the first model part is farther away, and rendering the second model part first when the second end-point of the virtual pin associated with the second model part is farther away.

2. The method according to claim 1 wherein the method further comprises identifying a curved beveled side and converting the curved beveled side into a series of straight edges.

3. The method according to claim 2 wherein the method further comprises dividing the curved beveled side into curved edges having anchor points at each end and control points between the anchor points.

4. The method according to claim 3 wherein the method further comprises converting the curved edges into straight edges.

5. The method according to claim 1 wherein the method further comprises duplicating, scaling and moving the outline to create side surfaces.

6. The method according to claim 1 wherein the method further comprises calculating an angle of each. connecting point of a bevel as the object is being rendered without storing angle data.

7. The method according the claim 1 wherein the method further comprises using the virtual pin to determine when to draw a model part.

8. The method according to claim 7 wherein the method further comprises positioning the virtual pin so that the virtual pin is substantially perpendicular to the surface of the first model part and to the second model part.

9. The method according to claim 8 wherein the method further comprises using endpoints of the virtual pin to determine a distance between the first model part and a view point and a distance between the second model part and the view point.

10. The method according to claim 7 wherein the method further comprises using a surface unit grid to create an outline around visible parts of the object.

11. The method according to claim 10 wherein the method further comprises dividing the surface unit grid into four sided segments.

12. The method according to claim 11 wherein the method further comprises using one segment and one side of the segment to determine whether the segment is visible or not.

13. The method according to claim 11 wherein the method further comprises determining whether a segment is visible or not.

14. The method according to claim 13 wherein the method further comprises using flags at each side of the segment in order for the virtual tracing pen to determine which direction to continue tracing.

15. The method according to claim 1 wherein the method further comprises rendering partial curves.

16. The method according to claim 1 wherein the method further comprises identifying surfaces and/or surface units.

17. The method according to claim 16 wherein the method further comprises identifying a boundary line between visible and non-visible segments of surfaces.

* * * * *